Jan. 3, 1928.

J. F. RALEIGH

TIRE CHAIN LOCK

Filed Sept. 7, 1926

Inventor
James F. Raleigh.
By Williams, Bradbury,
McCaleb & Hinkle Attys.

Jan. 3, 1928. 1,654,752
J. F. RALEIGH
TIRE CHAIN LOCK
Filed Sept. 7, 1926 2 Sheets-Sheet 2
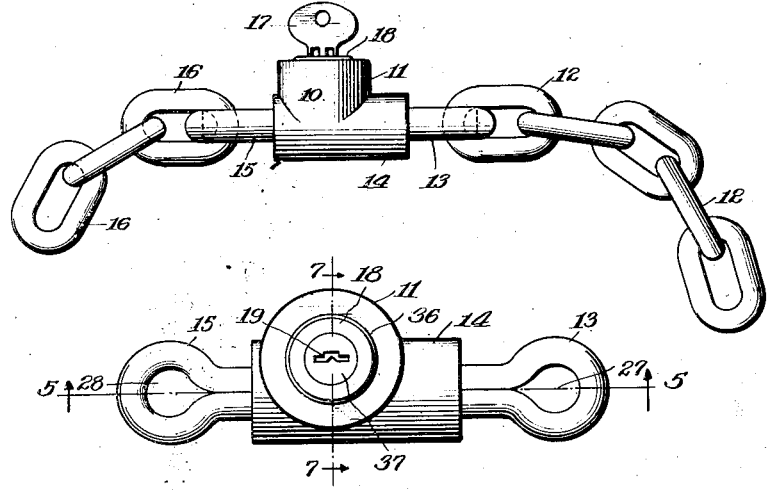
Fig. 3.
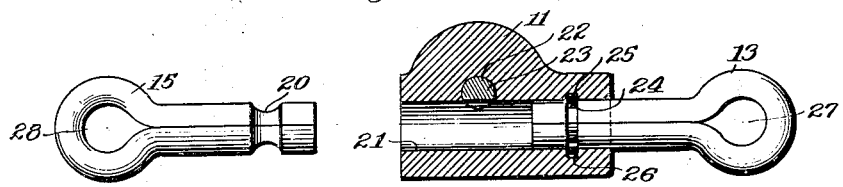
Fig. 4.
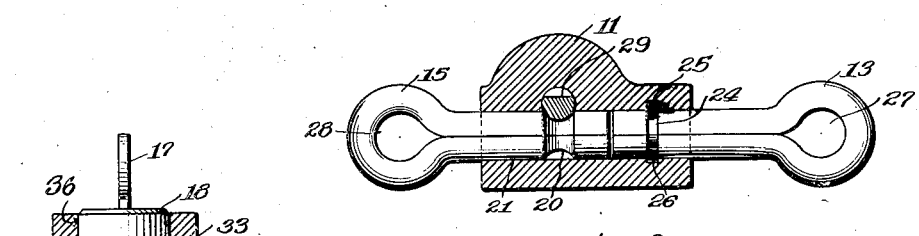
Fig. 5.
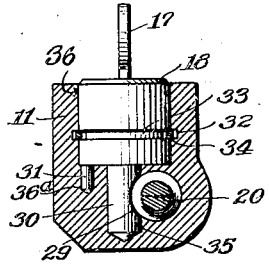
Fig. 7.
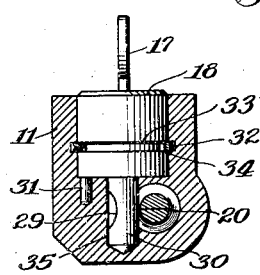
Fig. 8.
Fig. 6.
Inventor
James F. Raleigh
By Williams, Bradbury,
McColeb & Hinkle
Attys.

Patented Jan. 3, 1928.

1,654,752

UNITED STATES PATENT OFFICE.

JAMES F. RALEIGH, OF RIVER FOREST, ILLINOIS, ASSIGNOR TO PINES WINTERFRONT COMPANY, OF CHICAGO, ILLINOIS, A CORPORATION OF DELAWARE.

TIRE CHAIN LOCK.

Application filed September 7, 1926. Serial No. 133,892.

My invention comprises a simple and effective means for preventing theft of spare wheels or tires of automotive vehicles, by preventing the unauthorized removal of the said wheels or tires from their carrier without the destruction of the wheel so as to render it unfit for further use, but my invention is of general application and may be incorporated in devices for preventing theft of objects other than spare wheels.

More specifically, my invention is concerned with certain improvements in that type of theft preventing device, comprising a flexible member, as a chain or cable designed to be passed through openings in or around major parts of both the wheel and its carrier or other parts of the vehicle to which it is desired to lock the wheel, and provided with a locking member for joining the free ends of the said flexible member, thus preventing removal of the wheel.

All the locks of the prior art have been constructed with exposed parts held in fixed relation by various pins, cotters, and other fastening means, a characteristic of such locks being that the said fastening means are relatively the weakest parts, so that by applying ordinary gripping tools, as for instance, a pair of wrenches, and twisting the parts fixed by such pins, etc., the lock may be broken and its object defeated by ordinary working tools in a relatively short time. Other locks are easily broken by fracturing their brittle cast-iron casing with a sharp hammer blow, but my invention overcomes all these disadvantages and others, and among its salient objects, my invention contemplates:

First, the provision of a lock in which it is impossible to obtain unauthorized access to the article locked, by the application of a wrench or a plurality of wrenches or gripping tools to the lock, and breaking the locking member by manually twisting relatively fixed parts of the lock.

Second, the accomplishment of the foregoing results by the provision of a lock having all its exposed integral parts or surfaces freely rotatable relative to each other, thus preventing breaking by twisting, due to the total absence of resistance of the integral parts of the lock to rotatable forces relative to each other.

Third, the provision of a theft preventing device of the class described which is capable of attachment to the standard equipment tire carrier of modern automobile vehicles, with a minimum of labor and tools and by one not a skilled mechanic.

Fourth, the provision of a novel theft preventing device of the class described, simple in structure, easy to assemble and economical of manufacture.

In the accompanying drawings in which similar characters of reference refer to similar parts throughout the several views:

Figure 3 is a vertical elevation of my improved lock.

Figure 4 is a plan view of the same without the chain.

Figure 5 is a plan view of the lock of Figures 3 and 4, showing in unlocked relation a section of the lock casing taken on the lines 5—5 of Figure 4.

Figure 6 is a view similar to Figure 5 showing the parts in locked position.

Figure 7 is a vertical view of the lock, showing the lock casing in section on the line 7—7 of Figure 4 with the locking bolt in unlocked position.

Figure 8 is a view similar to Figure 7 with the locking bolt in locked position.

Figure 1:
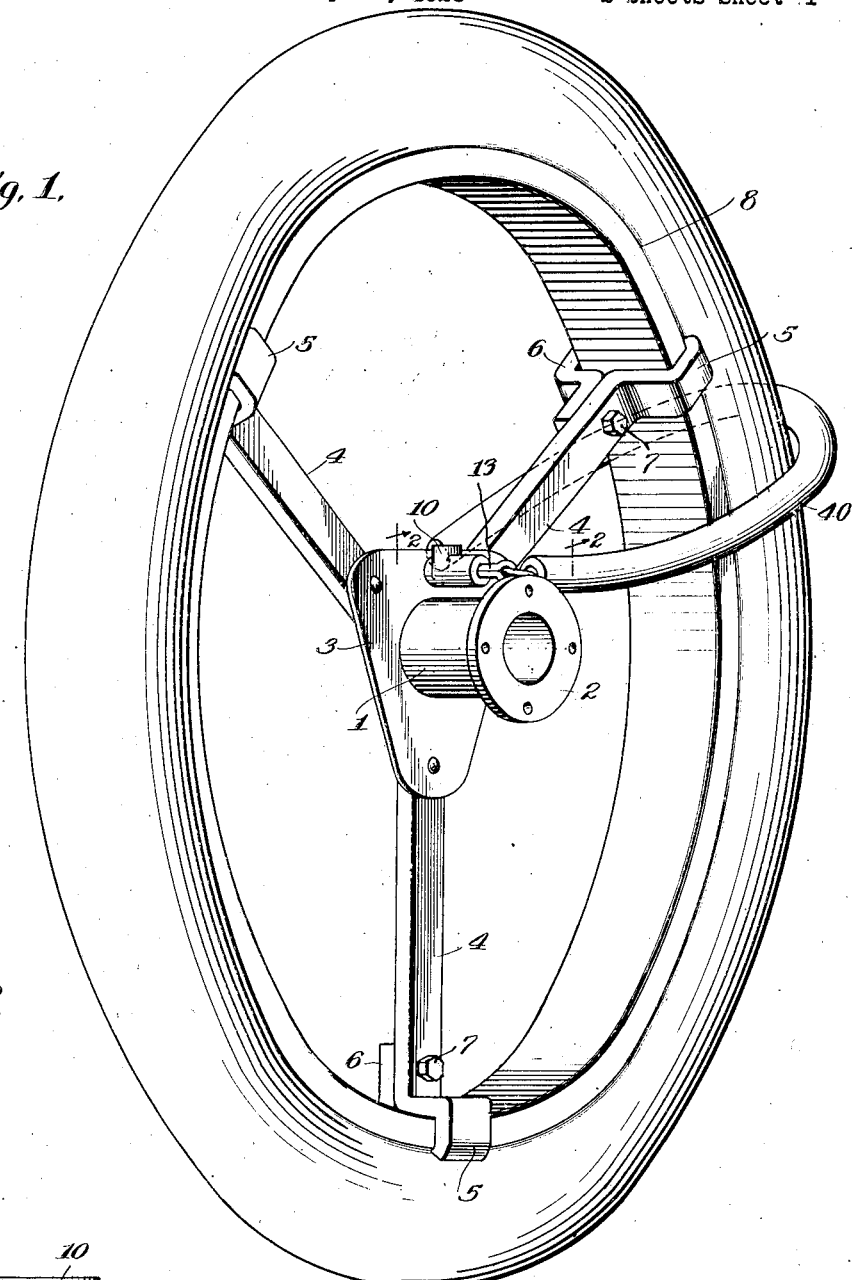
Figure 1 is a vertical elevation in perspective showing the application of my invention to the Ford standard equipment tire carrier.
Figure 2:
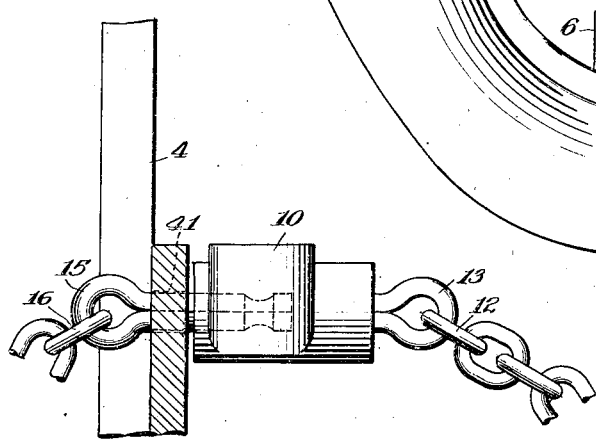
Figure 2 is a vertical elevation of the lock and carrier plate taken on the line 2—2 of Figure 1.

In the drawings, 1 denotes a supporting member, including a front flange 2 adapted to be permanently fixed or riveted to the car frame or body, and a rear carrier plate 3 adapted to support permanently the spider members 4, which are provided with the forwardly bent ends 5 and the removable lug members 6, held by the bolts 7, and adapted to removably support the rim 8 and tire 9, in a manner well known to those skilled in the art.

The lock 10 has its eyebolts 13 and 15 connected to the ends of the flexible member 40, which may be of any flexible material capable of withstanding high shearing and tensile stress, as a steel cable, but I prefer to use a steel chain covered with a tubular leather or rubber casing to protect the adjacent parts of the car from abrasion by the said chain.

The chain and lock may be disposed about the locked members in many different ways but I prefer to place the lock behind the carrier plate 3 and between the said plate and the car frame, thus placing the lock in a relatively inaccessible position hindering the application of breaking tools. In order to connect my device to the standard carrier in a simple manner, I prefer to bore a single hole in the said carrier plate, or in any other permanently fixed part of the carrier, the hole being of such size as to permit a forced fit with the eyebolt 15, which arrangement holds the end of the chain to the car, although the device is unlocked, thereby preventing its loss from the car; or I may make the eyebolt 13 of sufficient length to pass through the carrier plate and past the said eyebolts and the carrier plate before assembling the said eyebolt and casing permanently, in a manner hereinafter to be described. The latter method provides a locking chain which cannot be stolen, lost, or removed although left unlocked, and is permanently assembled with the carrier plate.

The locking device comprises an enclosing case 10, of T or L shape, comprising the transverse union of two cylindrical portions 11 and 14, the axis of the cylindrical portion 11 being slightly offset from that of the cylindrical portion 14 for a purpose which will appear more fully hereinafter. The said casing may be made of any metal or material adapted to resist destruction by fracture or otherwise, but I prefer to form the same of malleable cast-iron or steel, which cannot be broken by sharp impact. The casing 10 is centrally bored as at 36 in the cylindrical portion 11 for the reception of the lock barrel 18 comprising a conventional type of lock barrel having a rotatable key slot 19, the rotatable locking bolt 30 and the conventional tumbler mechanism (not shown) in its interior, adapted to be operated only by a key 17 of predetermined conformation.

The lock barrel 18 may protrude slightly from the cylindrical portion of the casing 11 without affording any substantial grip for a wrench or other tool or the barrel 18, but I prefer to seat the lock barrel 18 substantially wholly within the casing 11 leaving no exposed surface to apply such tools. The key slot plate 37 may also be of a type having an external surface freely rotatable in the lock barrel 18 thus precluding the use of a screw driver to apply breaking torque to the key slot and barrel, or to rotate the barrel relative to the casing 11, or to destroy the shape of the slot so as to prevent entrance of the key. The key slot plate 37 may likewise be of a size entirely covering the external end surface of the lock barrel 18, as well as to be freely rotatable in said barrel without a key and without actuating the lock, thereby providing all exposed integral parts freely rotatable relative to each other.

The circular bore 36 is continued axially by the smaller circular bore 35 adapted to receive the locking bolt 30, and to communicate and intercept transversely in offset relation, the circular bore 21 which extends through the casing 11 at the axis of the cylindrical portion 14. The circular bore 21 is adapted to receive the stems of the special eyebolts 13 and 15, of the shape of the standard cotter pin, but of a size, material and strength, commensurate with the strength of the flexible member 40, the ends of which are locked together. By the use of end members of this shape for the flexible member, I provide a structure which is economically manufactured, easily assembled and firmly locked and held in the lock casing 11, as both ends of the eyebolt are held inside the casing by the locking bolt. I prefer to make these eyebolts 13—15 as well as the chain links, of high quality drawn steel, the ends of the links of the chain being firmly welded together to form integral closed links of great strength. The eyebolt 13 is provided at its stem with an external annular slot 24 of rectangular cross section of sufficient depth to wholly contain the split steel ring 26, also of rectangular cross section and of resilient spring steel; the bore 21 at the right end (Fig. 5) is likewise provided with an internal annular rectangular slot 25 of the same width as the slot 24 but of less depth, preferably about half the depth of slot 24 so that the split ring 26 may spring out of the slot 24 only partially when the said slots are aligned, thereby permanently but rotatably fixing the two ends of the eyebolt 13 in the bore 21. In assembling the eyebolt casing and chain, the eyebolt is first looped through the end links of the chain, its ends hammered together and partially inserted in the bore 21 to the edge of the slot 24. The split spring ring is then sprung down into the slot 24 and the eyebolt stem further inserted in the bore 21 with its split ring, until the slots register, whereupon the ring 26 springs out a radial distance equal to half its thickness into the slot 25, preventing removal of the eyebolt but permitting its free rotation in the casing. The lock barrel 18 and the bore 36 are likewise provided with registering slots 33 and 32 respectively and are held in assembled relation by the split ring 34 in a similar manner, but the lock barrel is held from rotation relative to the casing 11 by the projecting pin 31 on the barrel 18 adapted to be received in the bore 36 of the casing 11 and to hold said lock barrel from rotation as well as to properly position the lock bolt of said barrel relative to the bore 21 for a purpose further to be described.

The rotatable locking bolt 30 is laterally recessed as at 29 with a circular recess, which recess when the said bolt is in open position is adapted to form a cylindrical continuation of the wall of the bore 21 where the bore 21 and the bore 35 intersect. The eyebolt 15, the stem of which is adapted to be slidably and rotatably received in the bore 21, is provided with an annular slot of the cross section of a segment of a circle, the straight side of said segment coinciding with the surface of said eyebolt, and the said annular slot is of a depth and shape such that when the eyebolt 15 is in locked position the surface of this slot in the said eyebolt coincides with and forms a continuation of the internal surface of the bore 35. In other words, the locking bolt 30 and the eyebolt 15 at its stem, are each cut away to an amount which is equal to that portion of the locking bolt 30 which protrudes in the intersecting bore 21, and to that portion of the locking bolt 30 which protrudes into the intersecting bore 35, but the slot in the locking bolt 30 is made annular in such manner that the operation of the said lock is as follows:

The locking bolt 30 is first turned by the key 17 to open position, as in Figures 5 and 7, whereupon the stem of the eyebolt 15 may be inserted in the bore 21 until the slot 20 permits free rotation of the locking bolt, which is then turned to locking position by the key 17. The cylindrical surface of locking bolt 30 then forms an obstruction in the slot 20 of the eyebolt, preventing axial movement or removal of the eyebolt 15 but permitting its free rotation due to the annular character of the slot 20.

It will thus be seen that I have invented a locking device having all its integral exposed parts and surfaces freely rotatable relative to each other so that no ordinary wrench or tool can be applied to integral parts held together to break the same apart by manually twisting the same relative to each other. Furthermore, by my invention, the lock may be made so short as to practically preclude the use of tools to break the said lock by lateral flexing or bending, the amount of bending moment capable of being applied by such tools depending, of course, on the distance between said tools.

While I have illustrated and described a preferred form of construction for carrying my invention into effect, this is capable of many variations and modifications without departing from the spirit of the invention, and I desire to avail myself of all such variations and modifications as come within the scope of the appended claims.

Having described my invention, what I claim as new and desire to secure by Letters Patent of the United States is:

1. In a device of the class described, a casing having a bore through the same, substantially cotter pin shaped eyebolts, each having its stem swivelled in one end of said bore, one of said eyebolts being releasably mounted, and locking means to lock the latter eyebolt comprising a transverse locking bolt.

2. In a device of the class described, a casing having a bore through the same, substantially cotter pin shaped eyebolts each with its stem swivelled in one end of said bore, one of the said eyebolts having an annular slot about its periphery, and locking means comprising a transverse locking bolt, rotatable in said slot and having another slot in which said eyebolt is rotatable and slidable.

3. In a device of the class described, an elongated casing having an axial bore extending through the same, having a transverse casing portion with an enlarged bore to receive a key actuated lock barrel, said transverse portion also having a counter bore intersecting said axial bore in offset relation, an eyebolt swivelled in one end of said axial bore, and a second eyebolt releasably and rotatably held in the other end of said axial bore by a rotatable bolt on said lock barrel.

4. In a device of the class described, a substantially cylindrical casing having an axial bore extending through the same, having a transverse cylindrical portion with an enlarged bore to receive a key actuated lock barrel, said transverse portion also having a counter bore intersecting said axial bore in offset relation, a cotter pin shaped eyebolt having its stem rotatably but non-reciprocably mounted in one end of said axial bore, a similar eyebolt having an annular slot in the same adapted to register with said counter bore, and a rotatable locking bolt carried by said lock barrel for locking said latter eyebolt in said axial bore.

5. In a theft preventing device, the combination of a casing having a plurality of bores therein, an eyebolt rotatably held in one of said bores, locking means disposed in another of said bores, including a rotatable locking bolt transversing said first mentioned bore, and a second eyebolt having an annular groove in its stem adapted to receive said locking bolt, said stem being rotatably held in said casing by said bolt.

6. In a theft preventing device, the combination of a casing with an eyebolt with its stem rotatably held therein, said casing having a bore, locking means including a rotatable locking bolt transversely projecting into said bore, said bolt having a groove of cylindrical surface forming a part of the walls of said bore when in unlocked position, and a second eyebolt having an annular shoulder engageable by said locking bolt to rotatably retain said eyebolt.

7. In a theft preventing device, the combination of a casing having two intersecting bores therein, a lock barrel in one bore having a rotatable locking bolt projecting transversely into the second bore, said barrel and first bore having registering annular grooves, a split steel ring in said grooves to retain said barrel in said bore, means for preventing a rotation of said barrel, an eyebolt rotatably held in one end of said second bore, and second eyebolt releasably and rotatably held in the other end of said second bore by said locking bolt.

8. In a theft preventing device, the combination of a casing having two intersecting bores therein, a lock barrel in one bore having a rotatable locking bolt projecting transversely into the second bore, said barrel and first bore having registering annular grooves, a split steel ring in said grooves to retain said barrel in said bore, means for preventing a rotation of said barrel, a substantially cotter pin shaped eyebolt in one end of said second bore, said eyebolt and bore having registering annular grooves, a split steel ring in said grooves to rotatably hold said eyebolt in said second bore, and a second eyebolt rotatably held in the other end of said second bore by said locking bolt.

9. In a theft preventing device, the combination of a casing having two intersecting bores therein, a lock barrel in one bore having a rotatable locking bolt projecting transversely into the second bore, said barrel and first bore having registering annular grooves, a split steel ring in said grooves to retain said barrel in said bore, means for preventing a rotation of said barrel, a substantially cotter pin shaped eyebolt in one end of said second bore, said eyebolt and bore having registering annular grooves, a split steel ring in said grooves to rotatably hold said eyebolt in said second bore, and a second eyebolt of similar form having its stem in the other end of said second bore, said locking bolt having a groove to permit insertion of said stem and said second eyebolt having an annular groove to receive said locking bolt.

In witness whereof, I hereunto subscribe my name this 2nd day of September, 1926.

JAMES F. RALEIGH.